United States Patent [19]

Seo et al.

[11] Patent Number: 5,600,116

[45] Date of Patent: Feb. 4, 1997

[54] OPTICAL DATA READING DEVICE

[75] Inventors: Shuzo Seo; Harumi Aoki, both of Tokyo, Japan

[73] Assignee: Asahi Kogaku Kogyo Kabushiki Kaisha, Tokyo, Japan

[21] Appl. No.: 349,996

[22] Filed: Nov. 29, 1994

[30] Foreign Application Priority Data

Nov. 29, 1993 [JP] Japan .................... 5-323138

[51] Int. Cl.$^6$ .................................................. G06K 7/10
[52] U.S. Cl. ........................................ 235/455; 235/454
[58] Field of Search ............................ 235/455, 471, 235/473, 454; 348/371

[56] References Cited

U.S. PATENT DOCUMENTS

| 2,912,495 | 11/1959 | Moon et al. | 348/371 X |
|---|---|---|---|
| 4,734,566 | 3/1988 | Senda et al. | 235/455 |
| 4,818,847 | 4/1989 | Hara et al. | 235/472 X |
| 4,855,814 | 8/1989 | Shiraishi et al. | 358/29 |
| 5,019,699 | 5/1991 | Koenck | 235/472 |
| 5,047,625 | 9/1991 | Iima et al. | 235/472 X |
| 5,260,554 | 11/1993 | Grodevant | 235/462 |
| 5,280,162 | 1/1994 | Marwin | 235/455 X |

FOREIGN PATENT DOCUMENTS 4-107410  4/1992  Japan .................... G02B 21/06

Primary Examiner—Donald T. Hajec
Assistant Examiner—Steven Wigmore
Attorney, Agent, or Firm—Greenblum & Bernstein P.L.C.

[57] ABSTRACT

An optical data reading device has a main housing and an optical system housing connected to the main housing. A light source and an imaging optical system are housed in the optical system housing. An image sensor, an image signal processing unit and a light source control unit are housed in the main housing. The light source illuminates a bar code, and the imaging optical system passes light reflected from the bar code into the main housing. The image sensor outputs a signal in accordance with the light passed by the imaging optical system. The image signal processing unit performs a predetermined process on the signal. The light source control unit controls the amount of light generated by the light source in accordance with a processing result obtained by the image signal processing unit.

23 Claims, 8 Drawing Sheets

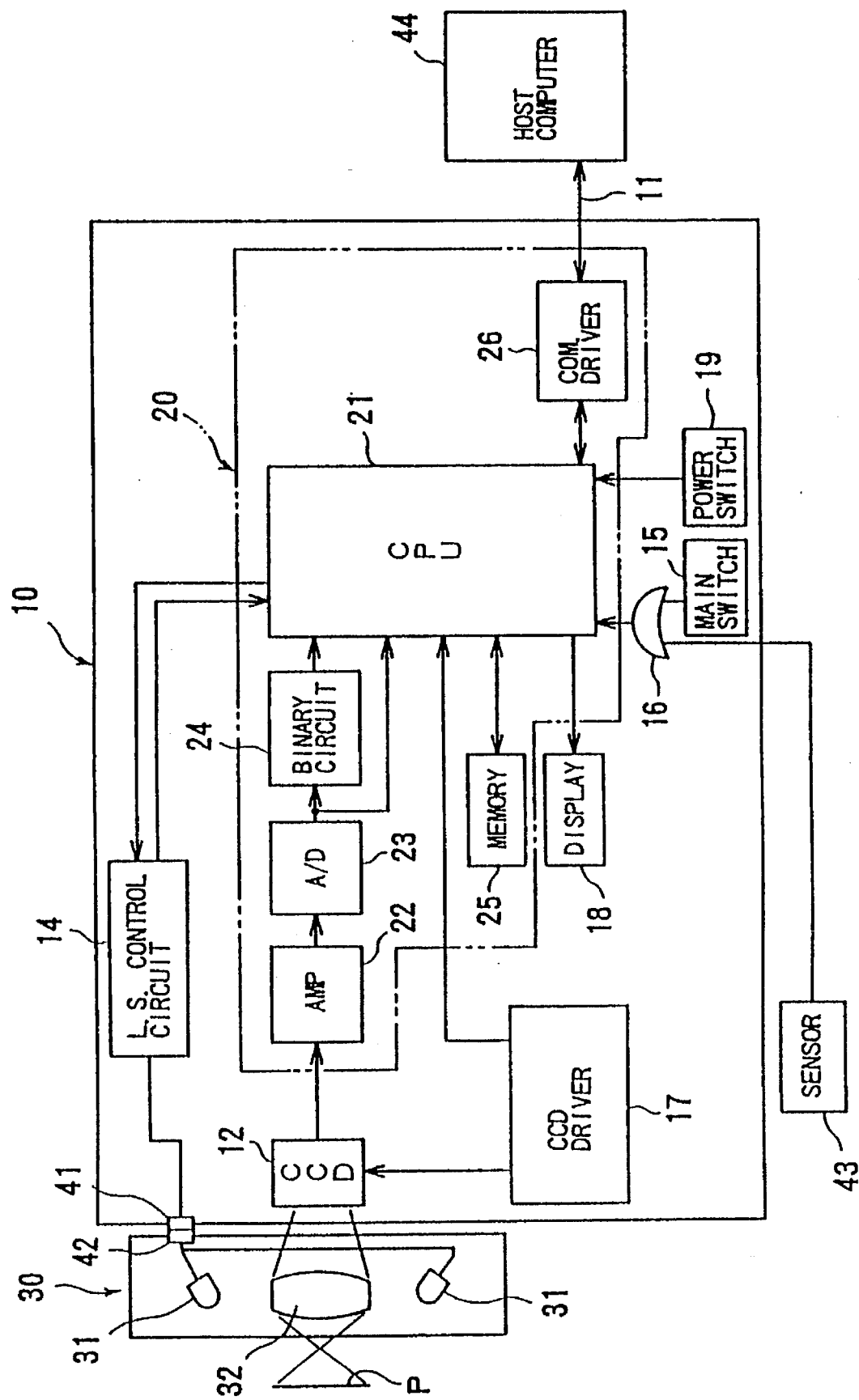

OPTICAL DATA READING DEVICE

BACKGROUND OF THE INVENTION

1. Field of the Invention

The present invention relates to an optical data reading device, such as a bar code reader, and especially to an improvement in a light source for illuminating an object, such as a bar-code.

2. Description of the Related Art

In a conventional opitcal data reading device, illuminating light is radiated onto an object, such as a bar code, so that an image of the bar code is formed on the light receiving surface of a CCD (charge coupled device) by the light reflected from the bar code. A signal outputted from the CCD, i.e., a signal corresponding to the image of the bar code, is inputted into an image signal processing circuit so that the signal is subjected to a predetermined process, and thus, the bar code is decoded. The light source for illuminating the bar code is an illuminating device, such as a halogen lamp, a fluorescent lamp or the like, and is separately provided from the optical data reading device.

The illuminating device, however, can be restricted when the light source unit of the illuminating device is too bulky to be located near the optical data reading device. Accordingly, there are problems in that the arrangement of the illuminating device is inconvenient and that illuminating the bar code with a uniform and proper brightness is difficult. Further, the illuminating device is expensive and may need a special power source, which makes the construction of the optical data reading device complex.

SUMMARY OF THE INVENTION

Therefore, an object of the present invention is to provide an optical data reading device in which a light source is easily arranged, illuminating an object, such as a bar code, with a uniform and proper brightness, and the construction is simple.

According to the present invention, there is provided an optical data reading device comprising a main housing, an optical system housing detachably connected to the main housing, a light source, an imaging optical system, an image sensor, an image signal processing unit, and a light source control unit.

The light source illuminates an object, and is housed in the optical system housing. The imaging optical system directs light reflected from the object into the main housing, and is housed in the optical system housing. The image sensor outputs a signal in accordance with the image formed by the imaging optical system, and is housed in the main housing. The image signal processing unit performs a predetermined process on the signal, and is housed in the main housing. The light source control unit controls the light source in accordance with the result obtained by the image signal processing unit.

Further, according to the present invention, there is provided an optical data reading device comprising a main housing, an optical system housing connected to the main housing, a light source housed in the optical system housing, an image sensor housed in the main housing, and a light source control unit.

The light source illuminates an object. The image sensor outputs an image signal in accordance with the image of the object. The light source control unit controls the light source, in accordance with the image signal, whereby the output signal has a value within a predetermined range.

Furthermore, according to the present invention, there is provided an optical data reading device comprising an optical system housing in which a light source is housed, a main housing in which an image sensor is housed, and control means.

The light source illuminates an object. The image sensor receives light reflected from the object, and outputs an image signal in accordance with the reflected beam. The control means controls the light source, in accordance with the image signal, in such a manner that the output signal has a predetermined value.

BRIEF DESCRIPTION OF THE DRAWINGS

The present invention will be better understood from the description of the preferred embodiments of the invention set forth below, together with the accompanying drawings, in which:

FIG. 3 is a block diagram generally showing the construction of a circuit provided in a main housing;

DESCRIPTION OF THE PREFERRED EMBODIMENTS

Figure 1:
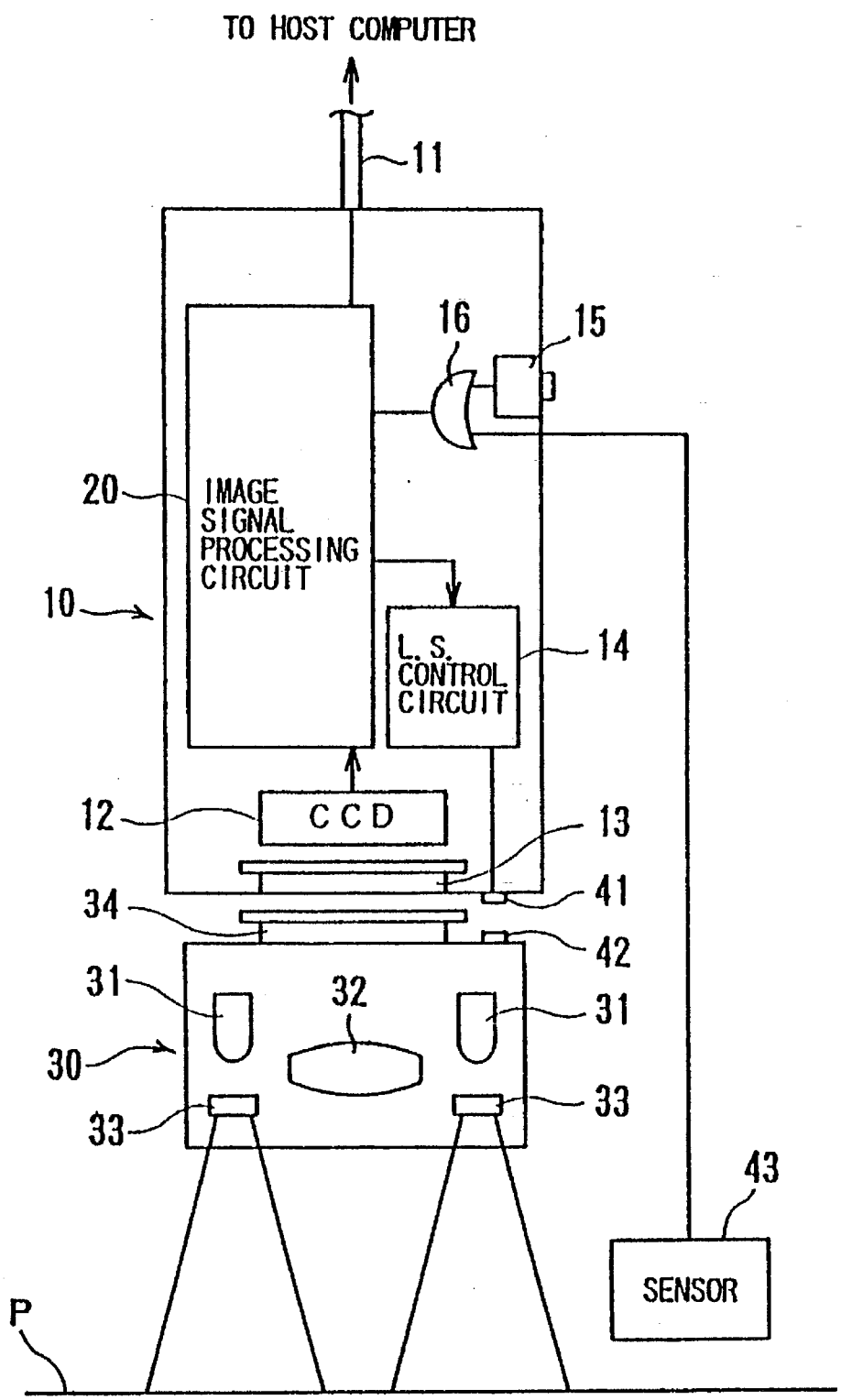
FIG. 1 is a block diagram showing a general construction of an optical data reading device of a first embodiment of the present invention.

The present invention will now be described with reference to embodiments shown in the drawings.

Figure 2A:
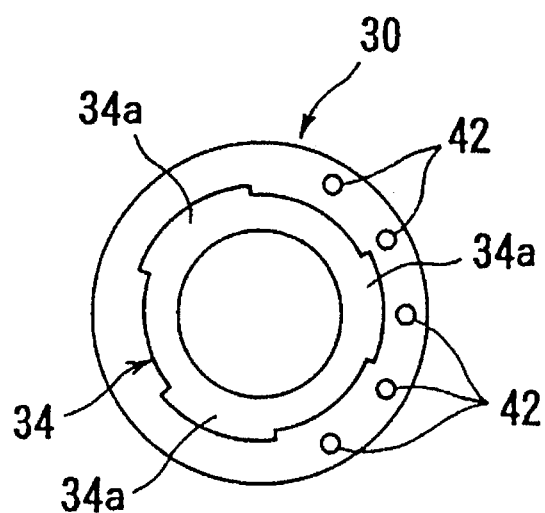
FIG. 2A is a plan view showing an optical system housing.
Figure 2B:
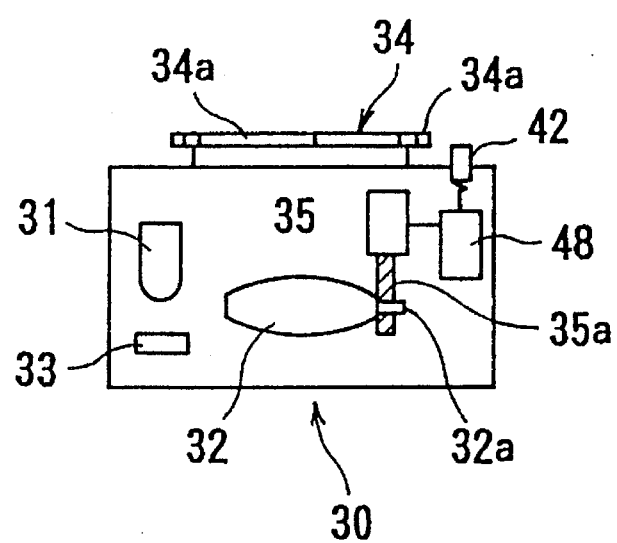
FIG. 2B is a block diagram showing the general construction of the optical system housing.

FIGS. 1 and 2 show the general construction of an optical data reading device of a first embodiment of the present invention. In FIG. 1, although an optical system housing 30 is shown detached from a main housing 10, the optical system housing 30 is connected to the main housing 10 when the device is being used. Note that the optical data reading device is a bar code reader.

The bar code reader decodes a bar code printed on a piece of paper P or an outer surface of a container, and the contents of the decoded bar code are outputted to a host computer (not shown) through a signal cable 11. A CCD 12 is provided in the main housing 10, so that an image of the bar code is formed on a light receiving surface of the CCD 12, which outputs a signal corresponding to the bar code. The signal is subjected to a predetermined process by a signal processing circuit 20, and thus, the bar code is decoded.

A plurality of lamps 31 (i.e., a light source), a lens 32 and an illuminating optical system 33 are housed in the optical system housing 30. The lamps 31 are provided for illuminating the bar code. The lens 32 is provided to direct the light, reflected from the bar code, into the main housing 10, i.e., to the light receiving surface of the CCD 12. The lamps 31 are light-emitting diodes (LEDs) or xenon lamps, for example. The illuminating optical system 33 is disposed in front of the lamps 31 (lower portion in FIG. 1) to direct the light from the lamps 31 uniformly onto the bar code. As to the illuminating optical system 33, several kinds of optical systems having suitable light sources and lenses with optical characteristics suitable for the object can be used.

The lens 32 can be displaced in the optical axis direction thereof. Namely, as shown in FIG. 2 (b), a threaded member 32a is formed on an outer periphery of the lens 32, and is threadingly engaged with a screw portion 35a formed on an output shaft of a motor 35. The motor 35 rotates under control of a motor drive circuit 36, and thus, the focus of the lens 32 is controlled.

The optical system housing 30 can be detached from and attached to the main housings 10. The optical system housing 30 is provided with a mount portion 34 with which a recess 13 (formed on the main housing 10) is engaged. The mount portion 34 and the recess 13 have constructions similar to a bayonet mount which is provided in a usual interchangeable single-lens reflex camera. Namely, as shown in FIG. 2A, the mount portion 34 is annular, and has three claws 34a, for example, projecting outward therefrom. The recess 13 of the main housing 10 is provided with claws similar to the claws 34a. Namely, by inserting the claws 34a into the recess 13 and rotating the mount 34, the optical system housing 30 is attached to the main housing 10. When the optical system housing 30 is detached from the main housing 10, the operation is reversed.

The position control of the lens 32 by the motor drive circuit 36 is carried out through a focus control circuit (not shown) in the main housing 10, and an ON-OFF control and a light-amount control of the light source 31 are carried out by a light source control circuit 14 housed in the main housing 10. To transmit command signals, outputted by the focus control circuit and the light source control circuit 14, from the main housing 10 to the optical system housing 30, and for outputting and receiving various signals between the main housing 10 and the optical system housing 30, first terminals 41 are provided on a lower surface of the main housing 10, i.e., a surface to which the optical system housing 10 is connected, and second terminals 42 are provided outside the mount portion 34 of an upper surface of the optical system housing 30. The second terminals 42 are connected to the motor drive circuit 36 and the light source 31 in the optical system housing 30. The first terminals 41 are connected to the light source control circuit 14 and the focus control circuit in the main housing 10. The terminals 41 and 42 are arranged on an arc, and are electrically connected to each other when the optical system housing 30 is attached to the main housing 10.

A main switch 15, for starting the reading of a bar code, is provided in the main housing 10, and a sensor 43, for sensing that a piece of paper or a container on which a bar code is printed is in front of the optical data reading device, is connected to the main housing 10. The main switch 15 outputs an ON-signal when depressed. The sensor 43 has a light-emitting diode and a photoreceptor element, for example, and outputs a signal when light from the light-emitting diode is reflected by the container or the like and sensed by the photoreceptor element. The main switch 15 and the sensor 43 are connected to an OR-circuit 16 provided in the main housing 10. An output terminal of the OR-circuit 16 is connected to the image signal processing circuit 20. Accordingly, when the main switch 15 is depressed, or when a container or the like is in front of the optical data reading device, a starting signal for a reading operation is outputted from the OR-circuit 16, so that the image signal processing circuit 20 is operated, and thus, a reading operation of the bar code is started.

FIG. 3 generally shows a construction of the circuit provided in the main housing 10. The image signal processing circuit 20 has a CPU (a microcomputer) 21, controlling the optical data reading device, an amplifier 22, an A/D converter 23, a binary circuit 24, a memory 25, and a communication driver 26. A signal outputted from the CCD 12 is amplified by the amplifier 22 and converted to a digital signal by the A/D converter 23. The digital signal is inputted directly into the CPU 21, and is also inputted into the binary circuit 24. A binarized output of the binary circuit 24 is inputted to the CPU 21.

In the CPU 21, pixel data having the highest luminance value among all the pixel data in the image signal directly inputted from the A/D converter 23 is detected, and it is determined whether or not the luminance value is within a predetermined range. When the luminance value is within the predetermined range, it is determined that the imaging operation has been carried out under a suitable exposure condition, and the bar code is decoded based on a binary image signal inputted through the binary circuit 24. Conversely, when the luminance value is not within the predetermined range, it is determined that the imaging operation has not been carried out under a suitable exposure condition, the amount of light produced by the light source 31 is controlled by the light source control circuit 14 and an imaging Operation is again carried out. Note that, when the luminance value of the detected pixel is below a lower limit in the predetermined range, the light amount control is performed in such a manner that the amount of light from the light source 31 is increased, and when the luminance value is above an upper limit in the predetermined range, the light amount control is performed in such a manner that the amount of light from the light source 31 i s decreased.

The contents of the bar code decoded by the CPU 21 is transmitted to a host computer 44 through the communication driver 26. Note that the program for the imaging process, and various data, are stored in the memory 25.

In the main housing 10, besides the circuits described above, a CCD driver 17, a display unit 18 having a liquid crystal panel, a power switch 19, and a power source (not shown) are housed. The CCD driver 17 is provided for driving the CCD 12, and a drive signal (pulse signal) outputted by the CCD driver 17 is inputted not only to the CCD 12 but also to the CPU 21. The imaging process is performed in accordance with the timing of the drive signal. The display unit 18 is controlled by the CPU 21, and a message indicating whether or not the bar code has been correctly decoded is indicated on the display unit 18. The power switch 19 is provided for turning ON and OFF the power source. The electric power outputted by the power source is supplied to each circuit housed in the main housing 10, and also supplied to the light source 31 housed in the optical system housing 30.

Note that the sensor 43 is fixed to a suitable position on the outer surface of the main housing 10.

Figure 4:
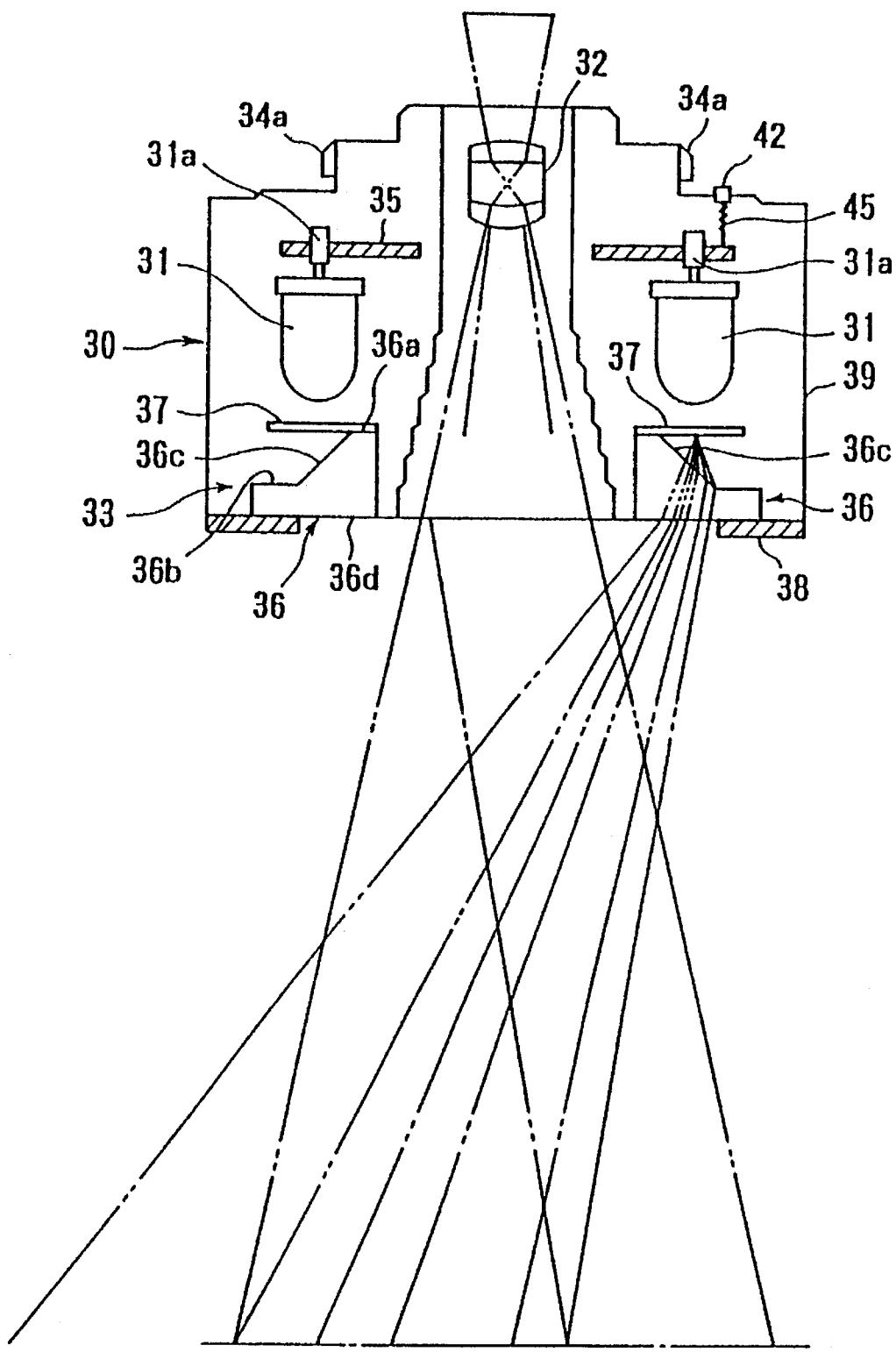
FIG. 4 is a view showing an arrangement of components provided in the optical system housing.

FIG. 4 shows an arrangement of the components provided in the optical system housing 30.

The housing member 39 of the optical system housing 30 is a cylindrical member, and the lens 32 is positioned at an upper portion on the center axis of the housing member 39. An annular support plate 35 is disposed coaxially around the center axis, and the lamps 31 are fixed to the support plate 35 and disposed annularly at predetermined positions. The support plate 35 is made for example of a conductive material. Terminals 31a of the lamps 31 are directly connected to the support plate 35, and the support plate 35 is electrically connected to the terminals 42 through a lead wire 45. Note that the number of the lamps 31 is not restricted to a specific value, and can be freely selected.

The illuminating optical system 33 contains an annular prism 36 and a diffuser 37. A bottom surface 36d of the prism 36 is fixed to the bottom of the housing member 39, and two annular flat planes 36a, 36b and a slanting surface 36c are formed on the upper surface of the prism 36. The diffuser 37 is attached on the annular flat plane 36a positioned to the inside the slanting surface 36c, by adhesive. The slanting surface 36c is inclined in such a manner that the prism 36 is thicker towards the axis of the housing member 39. The lamps 31 are located above the slanting surface 36c. Therefore, the light from the lamps 31 is diffused by the diffuser 37, enters the slanting surface 36c of the prism 36, and is radiated from the bottom surface 36d. The beam radiated from the bottom surface 36d of the prism 36 uniformly illuminates the bar code. Note that a portion on the outer periphery of the bottom surface 36d 1 and under the annular flat plane 36b is covered with an annular sheilding member 38 made of metal, for example.

Figure 5:
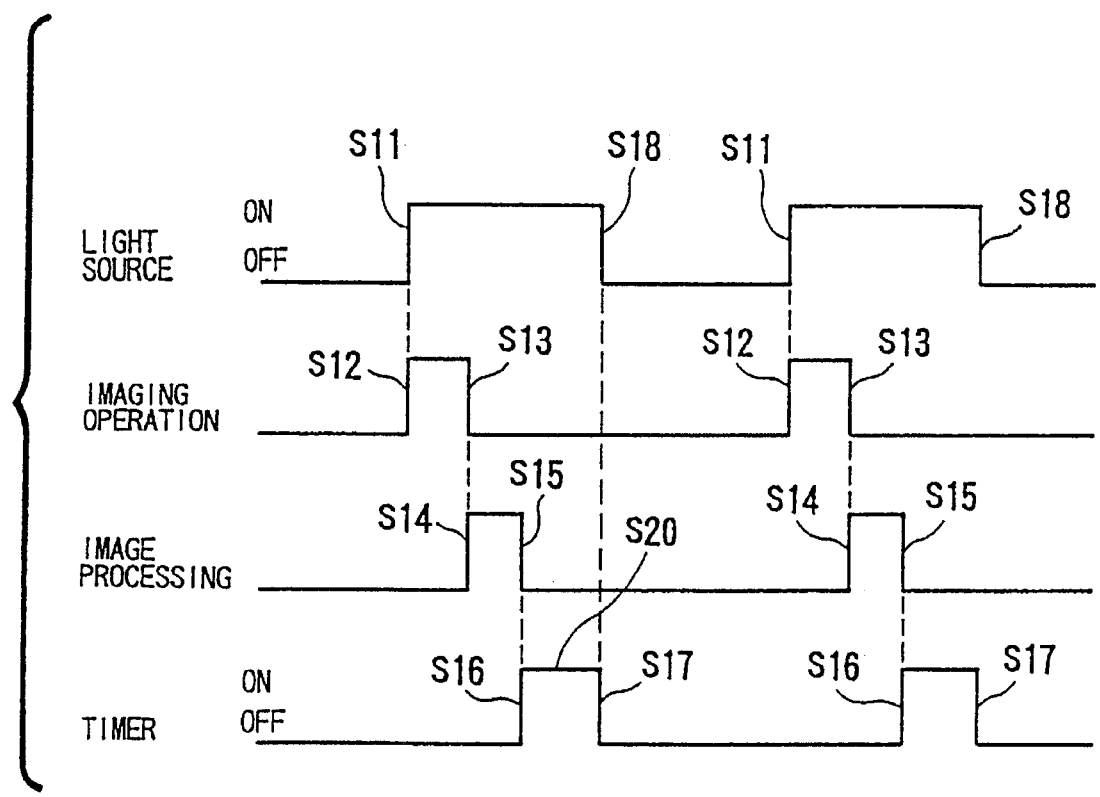
FIG. 5 is a timing chart showing an optical data reading operation of the first embdodiment.

FIG. 5 is a timing chart showing the optical data reading operation of the embdodiment.

When an ON-signal is outputted from the main switch 15 or the sensor 43, a bar code reading operation is started. Namely, the lamps 31 are turned ON (reference S11), and at the same times an imaging operation of the CCD 12 is started (reference S12). When the imaging operation is completed (reference S13), an imaging process in the image processing circuit 20 is started (reference S14). Based on the result of the image process, it is determined whether or not the light outputted by the lamps 31 was appropriate. When the light amount is appropriate, the bar code is decoded. When the image process is completed (reference S15), the timer is started (reference S16), and when a predetermined time has passed from the starting of the timer (reference S17), the lamps 31 are turned OFF (reference S18).

On the other hand, if the ON-signal is outputted from the main switch 15 or the sensor 43 while the timer is operating (reference S20), the imaging operation is started again (reference S12) without turning OFF the lamps 31, and the operations described above are repeated.

Figure 6:
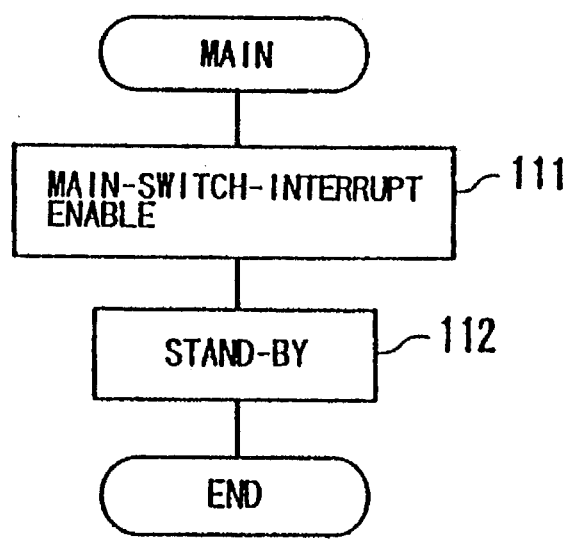
FIG. 6 is a flowchart of a main programm.
Figure 7:
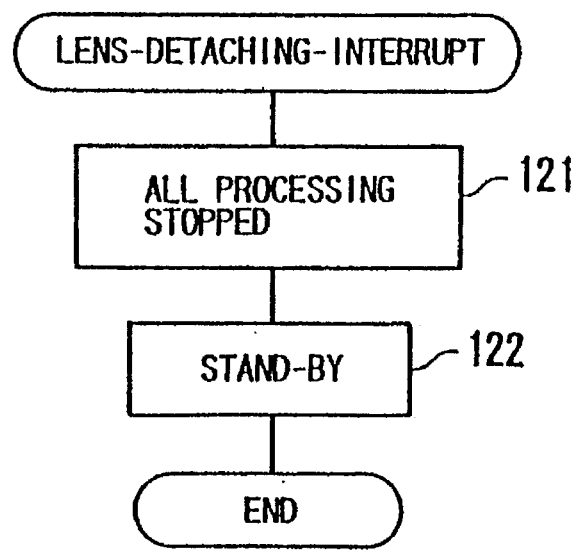
FIG. 7 is a flowchart of a lens-detaching-interrupt program.
Figure 8:
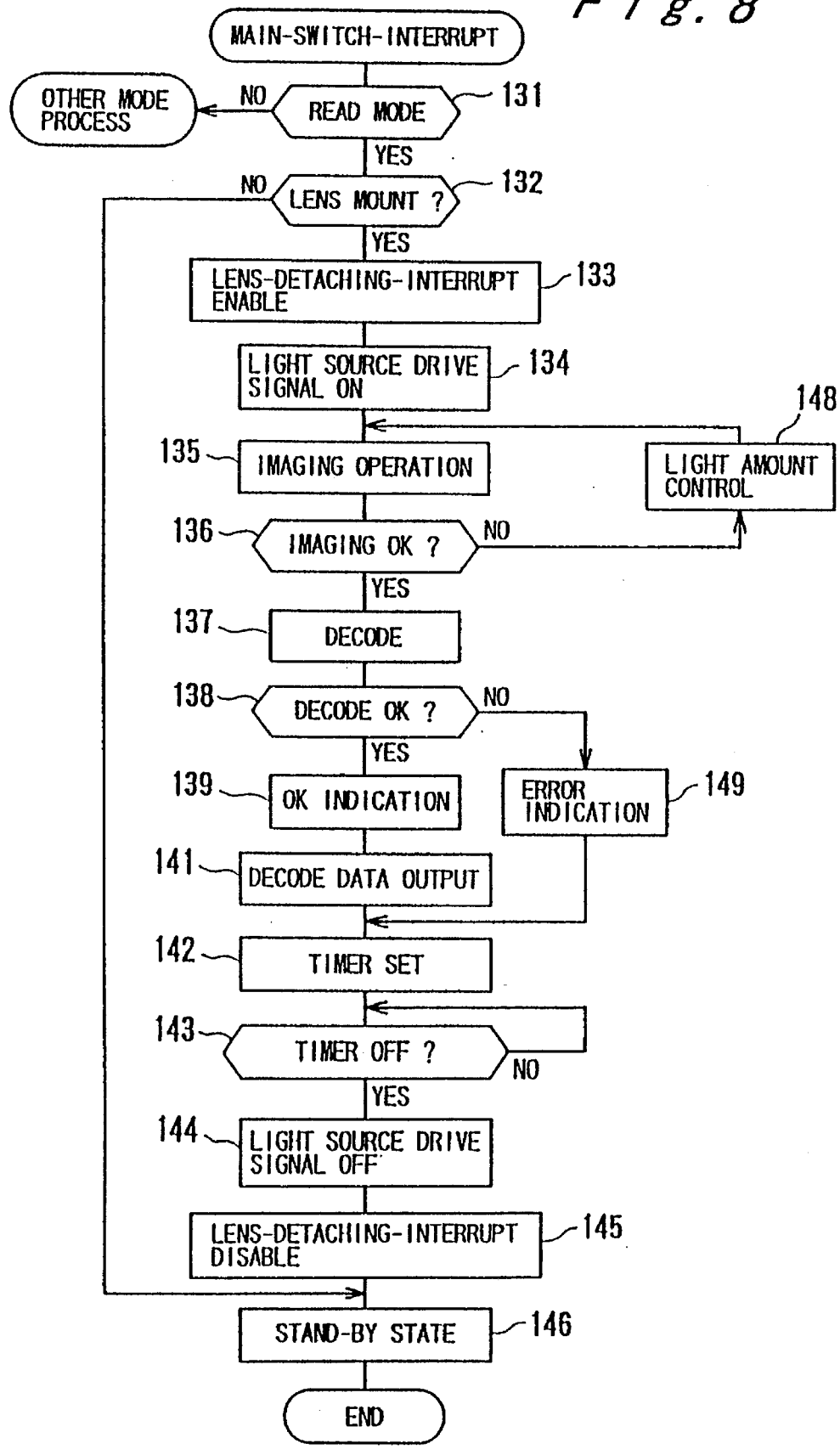
FIG. 8 is a flowchart of a main-switch,interrupt program.

FIGS. 6 through 8 are flowcharts of programms for controlling the image operation of the first embodiment. FIG. 6 is a flowchart of a main program, FIG. 7 is a flowchart of a lens-detaching-interrupt program, and FIG. 8 is a flowchart of a main-switch-interrupt program.

The main program is started by turning ON the power switch 19, i.e., when the power source is turned ON. The main program is always being executed while the power switch 19 is in the ON-state. In Step 111, the main-switch-interrupt program (FIG. 8) is set to a state in which the program can be executed, and in Step 112, the program is set to a stand-by condition. Namely, when the ON signal is outputted from the power switch 19 or the sensor 43, the main program is interrupted, and thus, the main-switch-interrupt program is executed.

The lens-detaching-interrupt program starts when the optical system housing 30 is detached from the main housing 10. In Step 121, all operations are stopped, and in Step 122, the process is set to a stand-by condition. Namely, when the optical system housing 30 is detached from the main housing 10, since control of the image process becomes unnecessary, all of the image processing operations are stopped.

As described above, the main-switch-interrupt program is interrupted when the ON-signal is outputted from the main switch 15 or the sensor 43 when the main-switch-interrupt can be accepted (i.e., when Step 112 of the main program is being executed).

In Step 131, it is determined whether a read mode is set. When a mode other than the read mode is set, a program corresponding to the set mode is executed, and when the read mode is set, Step 132 and the following steps are executed, so that the optical data reading operation is performed.

In Step 132, it is determined whether the lens 32 is mounted on the optical data reading device, i.e., whether the optical system housing 30 is attached to the main housing 10. When the lens 32 is mounted on the optical data reading device, a predetermined signal is transmitted from the light source control circuit 14 to the CPU 21 through the contact between the terminals 41, 42, so that Step 133 is executed, in which the lens-detaching-interrupt program (FIG. 7) is set to a state in which the program can be executed. In Step 134, a light source drive signal is set to an ON-state, so that the lamps 31 are turned ON.

In Step 135, an imaging operation is started, and thus, the CCD 12 is driven and a signal corresponding to the bar code is A/D converted. In Step 136, based on the highest luminance value among the pixel data included in the digital image signal, it is determined whether the imaging operation has been successful. When it is determined that the highest luminance value is not within a predetermined range, Step 148 is executed and a control of the lamps 31 is performed, through the light source control circuit 14, since the imaging operation has not been carried out with an appropriate exposure. Then, in Step 135, an imaging operation is again carried out.

When it is determined, in Step 136, that the highest luminance value is within the predetemined range, Step 137 is executed in which decoding of the bar code is performed based on the binary signal inputted through the binary circuit 24, since the imaging operation has been carried out with an appropriate exposure. It is determined in Step 138 whether the decode process has been successful, i.e., whether the bar code has been correctly decoded. When the decoding process has been successful in Step 139, a message indicating that the decode process was normal is shown on display unit 18. In Step 141, the contents of the bar code decoded in Step 137 is outputted to the host computer 44.

In Step 142, a light source timer is set and this timer operates for a predetermined time. When an OFF-condition of the light source timer is detected in Step 143, i.e., when the predetermined time has been passed after the timer set in Step 142, Step 144 is executed so that the light source drive signal is set to the OFF-state, and thus, the lamps 31 are turned OFF. In Step 145, the lens-detaching-interrupt program is set to a state in which the lens-detaching-interrupt program cannot be executed, and then, in Step 146, a stand-by state is set in which an interrupt to the main-switch-interrupt program is possible.

Conversely, if it is determined, in Step 138, that the decode process has not been carried out normally, a message indicating that the decode process is not normal is shown on the display unit 18 in Step 149. Then, Step 142 and the following processes are executed as described above.

Note that the duration of the light source timer set in Step 142 is 5 seconds, for example, and when an ON-signal is outputted from the main switch 15 of the sensor 43 before the light source timer turns OFF, in Step 143, the program is again started from the Step 131. Namely, in this case, a reading operation for the next bar code is carried out without turning off the lamps 31.

When it is determined in Step 132 that the lens 32 is not mounted, Step 146 is executed after Step 132, and thus the stand-by state is set.

As described above, in the first embodiment, the lamps 31 are disposed around the lens 32 provided in the optical system housing 30, and the light from the lamps 31 uniformly illuminates the bar code through the diffuser 37 and prism 36 included in the illuminating optical system 33. Further, the first embodiment is constructed in such a manner that, in accordance with the result of the image processing of the bar code in the image process circuit 20, the amount of light produced by the light source 31 is controlled, or the light source 31 is turned ON and OFF. Therefore, according to the first embodiment, it is not necessary that an illuminating device is provided separately from the optical data reading device, and the construction of the optical reading system is compact. Furthers according to the first embodiment, an operation for illuminating the bar code with uniform and proper brightness is not needed.

Furthermore, according to the first embodiment, since a specific power source for the light source 31 is not needed, the construction of the optical data reading system is simple, and the cost of the system can be reduced.

Figure 9:
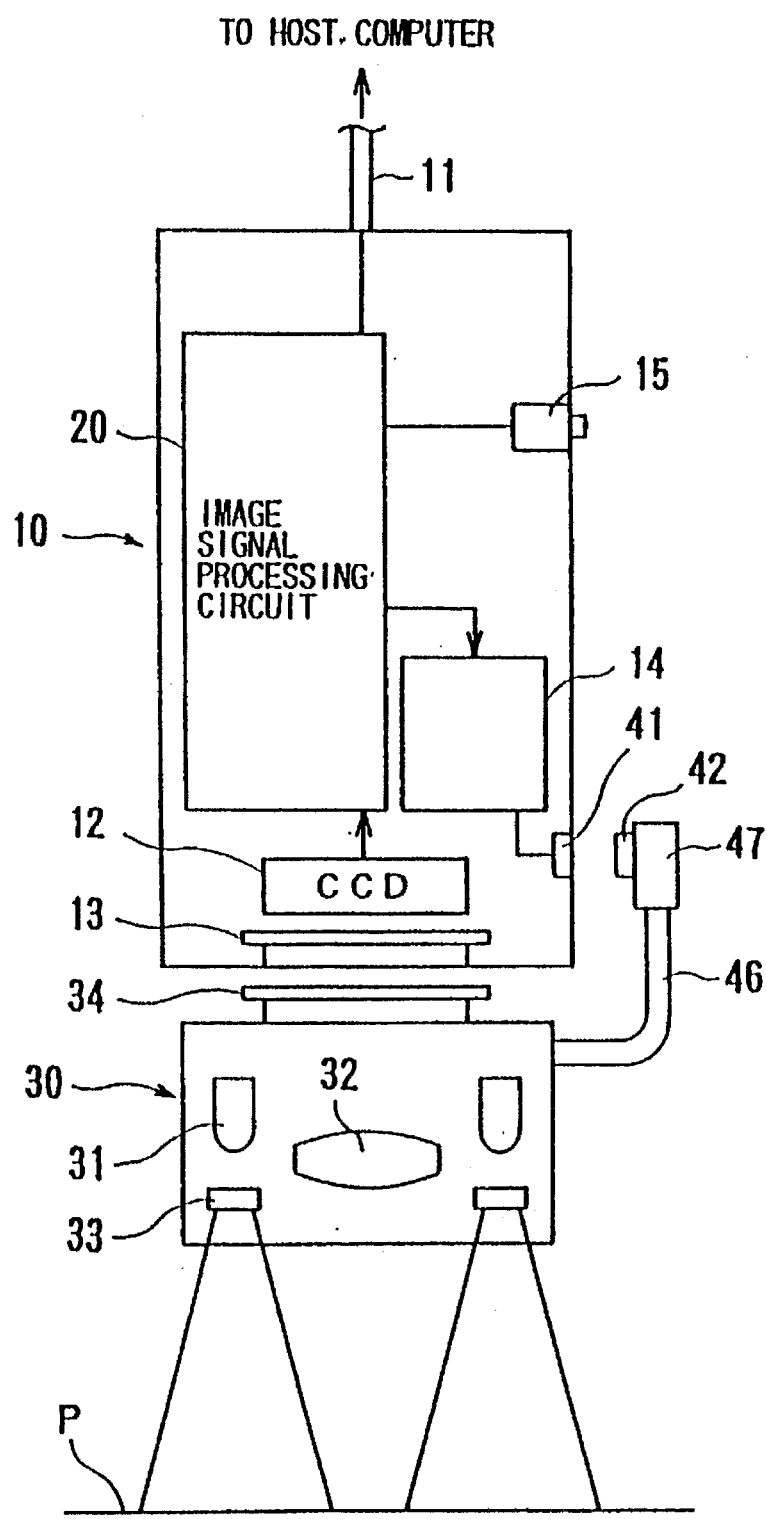
FIG. 9 is a block diagram showing the general construction of an optical data reading device of a second embodiment of the present invention.

FIG. 9 shows a general construction of a second embodiment. Only the parts different from these in the first embodiment are described.

A set of first terminals 41 are provided on a side surface of the main housing 10, i.e., a surface to which the optical system housing 30 is not attached. A set of second terminals 42 are provided in a connector 47 connected to the optical system housing 30 through a cable 46. The other constructions are the same as those of the first embodiment.

According to the second embodiment, since the first and second terminals 41, 42 are provided on the portion other than the mount portion 34, a mechanical connection and an electrical connection between the optical system housing 30 and the main housing 10 must be carried out in separate operations. Therefore, even if there is an error in the mechanical connection, the electrical connection can still be ensured.

Note that the present invention is not restricted to a bar code reader, but can be applied to other optical data reading devices, and can be used in many application.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 5-323138 (filed on November 29, 1993) which is expressly incorporated herein, by reference, in its entirety.

We claim:

1. An optical data reading device, comprising:

a main housing;

an optical system housing detachably connected to said main housing;

a light source that radiates illuminating light onto an object, said light source being housed in said optical system housing;

an illuminating optical system comprising an annular prism for uniformly illuminating said object;

an imaging optical system that passes light, reflected from said object, into said main housing, said imaging optical system having a primary focus lens, said imaging optical system being housed in said optical system housing;

an image sensor that outputs a signal in accordance with said image of said object formed by said imaging optical system, said image sensor being housed in said main housing;

an image signal processing unit that performs a predetermined process on said signal output by said image sensor, said image signal processing unit being housed in said main housing; and a light source control unit for controlling an amount of light generated by said light source in accordance with a processing result obtained by said image signal processing unit.

2. A device according to claim 1, wherein said object comprises a bar code.

3. A device according to claim 1, wherein said light source control unit turns ON and OFF said light source.

4. A device according to claim 1, wherein said light source control unit control said amount of said light produced by light source.

5. A device according to claim 1, wherein said light source control unit comprises a plurality Of connecting terminals through which at least a control signal for controlling said light source is transmitted, said plurality of connecting terminals being provided on a portion where said optical system housing is detachably connected to said main housing.

6. A device according to claim 1, wherein said light source control unit comprises a plurality of terminals through which at least a control signal for controlling said light source is transmitted, said terminals being provided in a connector connected to one of said main housing and said optical housing.

7. A device according to claim 1, wherein said light source has a plurality of lamps disposed annularly at predetermined positions.

8. A device according to claim 7, wherein said illuminating optical system comprises a diffuser fixed on said annular prism, said illuminating light being diffused by said diffuser and passing through said annular prism, whereby said illuminating light uniformly illuminates said object.

9. The optical data reading device according to claim 8, said illuminating optical system further comprising an annular shielding member.

10. A device according to claim 1, wherein said light source control unit is housed in said main housing.

11. The optical data reading device according to claim 1, said primary focus lens moveable along a direction of an optical axis of said imaging optical system to focus an image of said object formed by said imaging optical system on said image sensor.

12. An optical data reading device, comprising:

a main housing;

an optical system housing connected to said main housing having an image optical system, said image optical system having a primary focus lens for focusing light into said main housing;

a light source housed in said optical system housing, said light source illuminating an object;

an illuminating optical system comprising an annular prism for uniformly illuminating said object;

an image sensor housed in said main housing, said image sensor outputting a signal in accordance with light reflected from said object and focused on said image sensor by said primary focus lens of said image optical system; and a light source control unit controlling said light source in accordance with said signal output by said image sensor, whereby said output signal has a value within a predetermined range.

13. The optical data reading device according to claim 12, said image sensor comprising a charged coupled device.

14. The optical data reading device according to claim 11, further comprising means for sensing a presence of said object within an imaging area of said optical data reading device.

15. The optical data reading device according to claim 12, said light source control unit comprising a plurality of connecting terminals, said plurality of connecting terminals being provided on a portion where said optical system housing is detachably connected to said main housing.

16. The optical data reading device according to claim 12, said primary focus lens moveable along a direction of an optical axis of said image optical system to focus an image of said object formed by said image optical system on said image sensor.

17. An optical data reading device, comprising:

an optical system housing in which a light source and an image optical system are housed, said light source illuminating an object, and said image optical system having a primary focus lens for focusing light;

an illuminating optical system comprising an annular prism for uniformly illuminating said object;

a main housing in which an image sensor for receiving light reflected from an object and focused on said image sensor by said primary focus lens of said image optical system is housed, said image sensor outputting a signal in accordance with said reflected light; and means for controlling said light source in accordance with said signal output by said image sensor in such a manner that said output signal has a predetermined value.

18. The optical data reading device according to claim 17, said image sensor comprising a charged coupled device.

19. The optical data reading device according to claim 17, further comprising means for sensing a presence of said object within an imaging area of said optical data reading device.

20. The optical data reading device according to claim 17, said controlling means comprising a plurality of connecting terminals through which a control signal for controlling said light source is transmitted.

21. The optical data reading device according to claim 17, said primary focus lens moveable along a direction of an optical axis of said image optical system to focus an image of said object formed by said image optical system on said image sensor.

22. An optical data reading device, comprising:

a main housing having an image sensor for receiving light reflected from an object;

an optical system housing, said optical system housing connected to said main housing by a mount portion;

a lens provided in said optical system housing for directing light from said object into said main housing, said lens moveable along an optical axis direction of said optical system housing to focus an image of said object on said image sensor;

a plurality of terminals provided outside said mount portion on an upper surface of said optical system housing, said plurality of terminals transmitting command signals outputted by a focus control circuit and a light source control circuit, and said plurality of terminals transmitting signals between said main housing and said optical system housing.

23. The optical data reading device according to claim 22, said light source control unit controlling an amount of light generated by a light source in accordance with a processing result obtained by said image sensor.

\* \* \* \* \*

UNITED STATES PATENT AND TRADEMARK OFFICE
CERTIFICATE OF CORRECTION

PATENT NO. : 5,600,116
DATED : February 4, 1997
INVENTOR(S) : S. SEO et al.

It is certified that error appears in the above-indentified patent and that said Letters Patent is hereby corrected as shown below:

At column 8, line 30 (claim 4, line 2), change "control" to ---controls---.(second occurrence)

At column 8, line 33 (claim 5, line 2), change "Of" to ---of---.

At column 9, line 18 (claim 14, line 1), change "11," to ---12,---.

Signed and Sealed this

Thirteenth Day of May, 1997

Attest:

BRUCE LEHMAN

Attesting Officer      Commissioner of Patents and Trademarks